United States Patent
Tomzynska et al.

(10) Patent No.: US 12,187,871 B2
(45) Date of Patent: Jan. 7, 2025

(54) CARBON NANOTUBE ENHANCED POLYMERS AND METHODS FOR MANUFACTURING THE SAME

(71) Applicant: The Boeing Company, Chicago, IL (US)

(72) Inventors: Anna M. Tomzynska, Seal Beach, CA (US); Richard W. Aston, Brea, CA (US); Nicole M. Hastings, Redondo Beach, CA (US)

(73) Assignee: The Boeing Company, Arlington, VA (US)

( * ) Notice: Subject to any disclaimer, the term of this patent is extended or adjusted under 35 U.S.C. 154(b) by 786 days.

(21) Appl. No.: 15/825,745

(22) Filed: Nov. 29, 2017

(65) Prior Publication Data
US 2019/0062524 A1 Feb. 28, 2019

Related U.S. Application Data (60) Provisional application No. 62/550,178, filed on Aug. 25, 2017.

(51) Int. Cl.

| | |
|---|---|
| *B32B 9/00* | (2006.01) |
| *B29B 7/90* | (2006.01) |
| *B29C 64/118* | (2017.01) |
| *B29C 64/153* | (2017.01) |
| *B33Y 10/00* | (2015.01) |
| *B33Y 70/10* | (2020.01) |
| *C08K 3/04* | (2006.01) |
| *B29K 507/04* | (2006.01) |
| *B29L 31/30* | (2006.01) |

(52) U.S. Cl.
CPC ............... *C08K 3/041* (2017.05); *B29B 7/90* (2013.01); *B29C 64/118* (2017.08); *B29C 64/153* (2017.08); *B33Y 10/00* (2014.12); *B33Y 70/10* (2020.01); *B29K 2507/04* (2013.01); *B29L 2031/30* (2013.01); *C08K 2201/001* (2013.01); *Y10T 428/30* (2015.01)

(58) Field of Classification Search
CPC ......... C01B 31/04; B82Y 30/00; H01B 30/04; Y10T 428/30
USPC ....................................................... 428/408
See application file for complete search history.

(56) References Cited

U.S. PATENT DOCUMENTS

| | | | |
|---|---|---|---|
| 9,353,292 B2 * | 5/2016 | Quintero Rangel | ..... C09D 7/70 |
| 2012/0123061 A1 | 5/2012 | Cheng et al. | |

(Continued)

FOREIGN PATENT DOCUMENTS

| | | |
|---|---|---|
| DE | 10 2010043470 | 5/2012 |
| DE | 10 2017200448 | 7/2017 |

(Continued)

OTHER PUBLICATIONS

Mei Zhang & Ray Baughman, Assembly of Carbon Nanotube Sheets, in Electronic Properties of Carbon Nanotubes 3-19 (Jose Mauricio Marulanda, ed. 2011).*

(Continued)

*Primary Examiner* — Daniel H Miller
(74) *Attorney, Agent, or Firm* — Walters & Wasylyna LLC (57) ABSTRACT

A carbon nanotube enhanced polymer includes a polymer and a plurality of carbon nanotube sheetlets mixed with the polymer. The carbon nanotube sheetlets each include a network of intertwined carbon nanotubes.

20 Claims, 5 Drawing Sheets

(56) References Cited

U.S. PATENT DOCUMENTS

| | | |
|---|---|---|
| 2012/0294659 A1 | 11/2012 | Lee et al. |
| 2013/0203928 A1 | 8/2013 | Hocke et al. |
| 2014/0264187 A1 | 9/2014 | Lake et al. |
| 2016/0200460 A1* | 7/2016 | Aston ............... B32B 5/26 244/171.7 |
| 2016/0297935 A1 | 10/2016 | Reese et al. |

FOREIGN PATENT DOCUMENTS

| | | |
|---|---|---|
| RU | 2 564 029 | 9/2015 |
| WO | WO 2014/197078 | 12/2014 |

OTHER PUBLICATIONS

Megha Chitranshi et al., Carbon Nanotube Sheet-Synthesis and Applications, 10 Nanomaterials 2023, 2023-24, Fig. 1 (2020).*
European Patent Office, "Extended European Search Report," App. No. 18177830.9 (Aug. 3, 2018).
National Institute of Industrial Property (Brazil), Office Action, with English translation, App. No. BR102018015678-0 (May 5, 2022).
Canadian Intellectual Property Office, Office Action, App. No. 3,010,858 (Jan. 10, 2024).
Federal Service for Intellectual Property, Office Action, with English translation, App. No. 2018122095/04(034933) (Jul. 26, 2021).

* cited by examiner

CARBON NANOTUBE ENHANCED POLYMERS AND METHODS FOR MANUFACTURING THE SAME

PRIORITY

This application is a non-provisional of, and claims priority from, U.S. Ser. No. 62/550,178 filed on Aug. 25, 2017.

FIELD

This application relates to polymer compounds having conductive properties and, more particularly, to carbon nanotube enhanced polymers suitable for use in air and space vehicles.

BACKGROUND

Static charges can cause a range of effects, including interference with scientific measurements or electronic components.

For applications that require dissipation of static charges, polymer compounds having conductive properties have a number of advantages over other materials, including being lightweight and capable of processing to complex shape. Multiple technologies are available to impart conductive properties into polymer materials.

To provide a static dissipative bleed desired for air and space vehicles, a maximum resistance of 1E9 (1×10^9) Ohms can be provided to polymers with a percentage weight loading of up to 30% carbon fibers. This high percentage weight loading of the carbon fibers reduces the overall mechanical performance of the base polymer material, particularly the toughness of the base polymer material.

Accordingly, those skilled in the art continue with research and development in field of polymer compounds having conductive properties.

SUMMARY

In one aspect, the disclosed carbon nanotube enhanced polymer may include a polymer and a plurality of carbon nanotube sheetlets mixed with the polymer. The carbon nanotube sheetlets may each include a network of intertwined carbon nanotubes.

In another aspect, the disclosed method for manufacturing a carbon nanotube enhanced polymer includes: providing a plurality of carbon nanotube sheetlets, the carbon nanotube sheetlets each including a network of intertwined carbon nanotubes; and mixing the plurality of carbon nanotube sheetlets with a polymer.

In yet another aspect, the disclosed method for manufacturing a carbon nanotube enhanced polymer includes: providing a plurality of carbon nanotube sheetlets mixed with a polymer, the carbon nanotube sheetlets each including a network of intertwined carbon nanotubes; and forming the mixture of carbon nanotube sheetlets and polymer into an article having final or near-final dimensions.

Other aspects of the disclosed carbon nanotube enhanced polymer, method for manufacturing a carbon nanotube enhanced polymer, and method for using a carbon nanotube enhanced polymer will become apparent from the following detailed description, the accompanying drawings and the appended claims.

DETAILED DESCRIPTION

Figure 5:
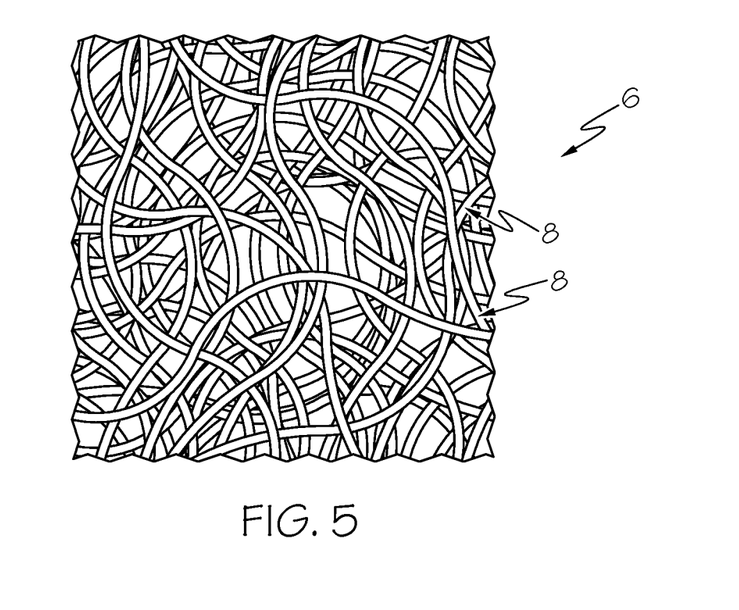
FIG. 5 is a sectional view of a portion of a carbon nanotube sheetlet including a network of disordered intertwined carbon nanotubes.

Disclosed is carbon nanotube enhanced polymer 2 that includes a polymer 4 and a plurality of carbon nanotube sheetlets 6 mixed with the polymer 4, the carbon nanotube sheetlets 6 each including a network of intertwined carbon nanotubes 8 (FIG. 5). The form of the carbon nanotube enhanced polymer 2 is not limited. The carbon nanotube enhanced polymer 2 may be in the form of a precursor for subsequent processing, such as a precursor for subsequent processing by an additive manufacturing process, such as a layer-by-layer additive manufacturing process, e.g. fused deposition modeling or selective laser sintering. Alternatively, the carbon nanotube enhanced polymer 2 may be in the form of an article having final or near-final dimensions, such as an article formed by an additive manufacturing process, such as a layer-by-layer additive manufacturing process, e.g. fused deposition modeling or selective laser sintering.

Figure 1:
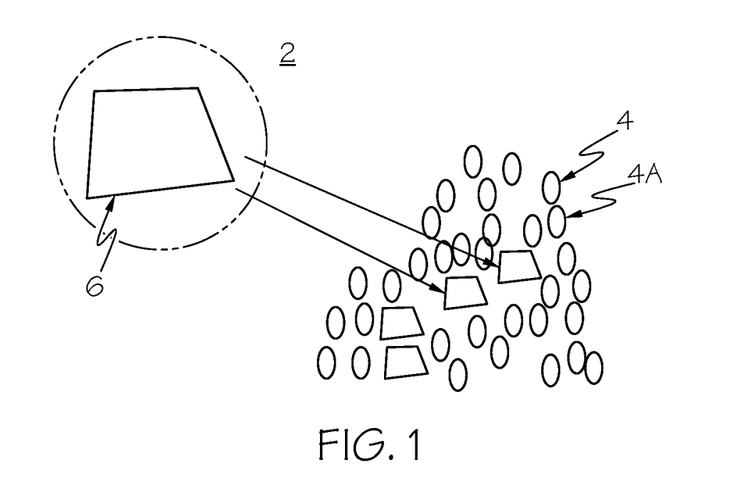
FIG. 1 is a representation of a first aspect of a carbon nanotube enhanced polymer of the present description.

FIG. 1 illustrates a first aspect of the carbon nanotube enhanced polymer 2, in which the carbon nanotube enhanced polymer 2 includes a polymer 4 in the form of a polymer powder 4A, and the plurality of carbon nanotube sheetlets 6 are mixed with the polymer powder 4A. The mixture of polymer powder 4A and carbon nanotube sheetlets 6 may be subsequently processed by, for example, sintering the polymer 4 to embed the plurality of carbon nanotube sheetlets 6 within a polymer matrix formed from the polymer powder 4A. In other words, the polymer 4 acts as a polymer matrix only after subsequent processing (e.g., sintering), wherein the subsequent processing renders the polymer 4 such that it acts as a binder that supports the carbon nanotube sheetlets 6. The subsequent processing of the mixture of polymer powder 4A and carbon nanotube sheetlets 6 is not limited and may include subsequent processing by an additive manufacturing process, e.g. selective laser sintering, to form an article having final or near-final dimensions.

Figure 2:
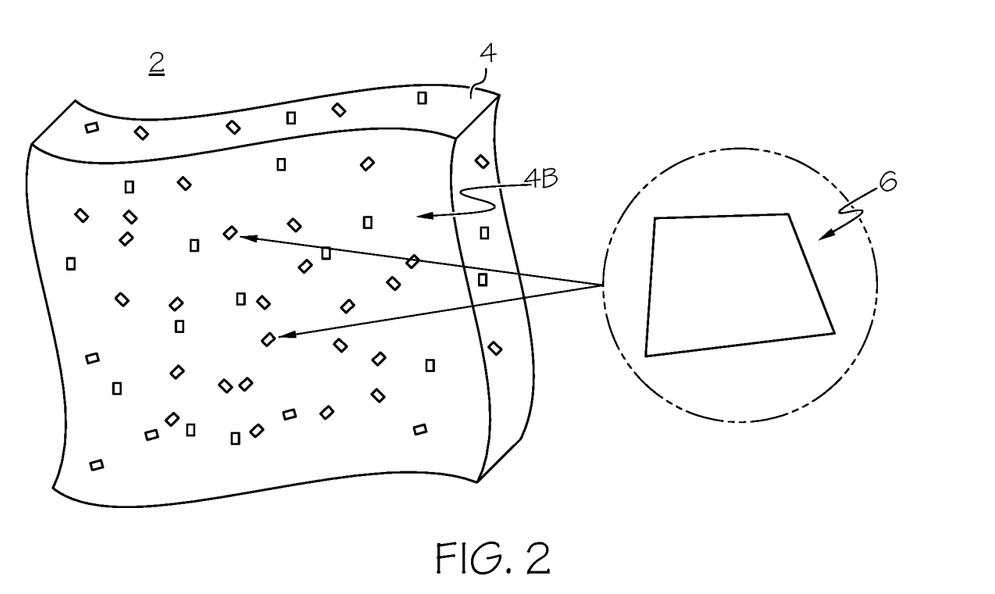
FIG. 2 is a sectional view of a second aspect of a carbon nanotube enhanced polymer of the present description.

FIGS. 2 to 5 illustrate a second aspect of the carbon nanotube enhanced polymer 2. As illustrated in FIG. 2, the carbon nanotube enhanced polymer 2 includes a polymer matrix 4B formed from the polymer 4, and the plurality of carbon nanotube sheetlets 6 are embedded within the polymer matrix 4B. The carbon nanotube enhanced polymer 2 may take any form, such as a precursor for subsequent processing or an article having final or near-final dimensions.

Figure 3:
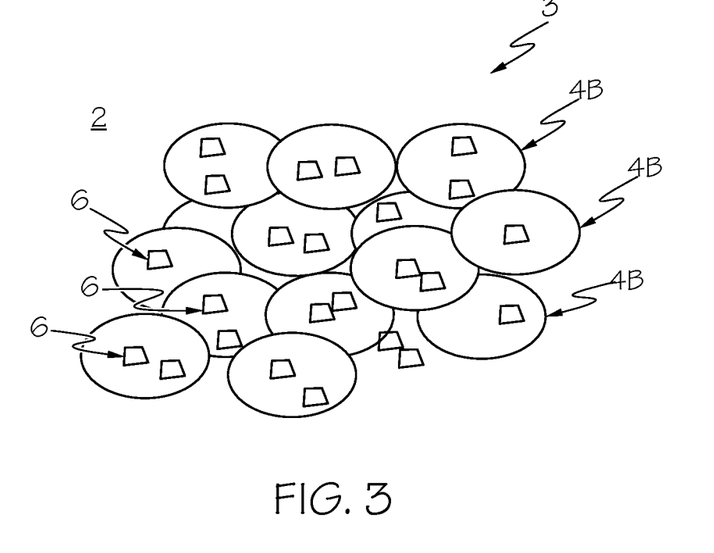
FIG. 3 is an example of the second aspect of a carbon nanotube enhanced polymer of FIG. 2.

As illustrated in FIG. 3, the carbon nanotube enhanced polymer 2 may take the form of a plurality of particulates 3, such as pellets, having carbon nanotube sheetlets 6 embedded within a polymer matrix 4B of the polymer 4. The plurality of particulates 3 may be made, for example, from subsequent processing of the above-described mixture of polymer powder 4A (FIG. 1) and carbon nanotube sheetlets 6. The plurality of particulates 3 may itself be subsequently processed by, for example, an additive manufacturing process, e.g. selective laser sintering, to form an article having final or near-final dimensions.

Figure 4:
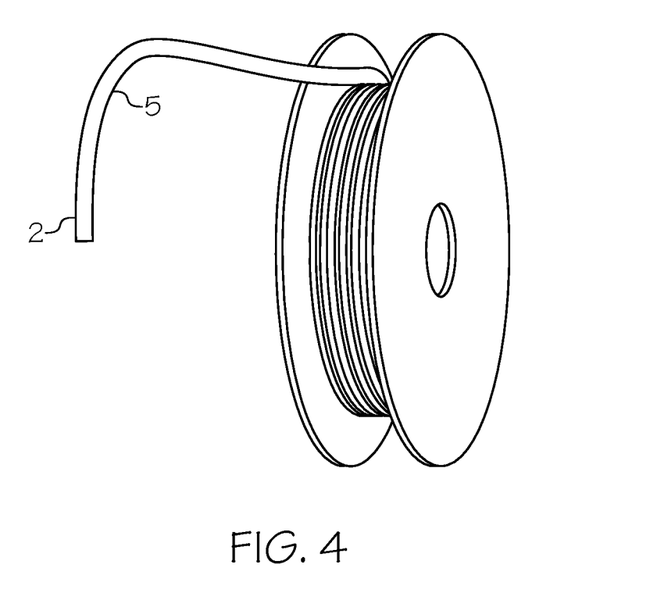
FIG. 4 is another example of the second aspect of a carbon nanotube enhanced polymer of FIG. 2.

As illustrated in FIG. 4, the carbon nanotube enhanced polymer 2 may take the form of a filament 5, such as fibers or strands, having carbon nanotube sheetlets (not shown) embedded within a polymer matrix (not shown) of the plurality of particulates. The filament 5 may be made, for example, from subsequent processing of the above-described mixture of polymer powder and carbon nanotube sheetlets. The filament itself may be subsequently processed by, for example, an additive manufacturing process, e.g. fused deposition modeling, to form an article having final or near-final dimensions.

Figure 6:
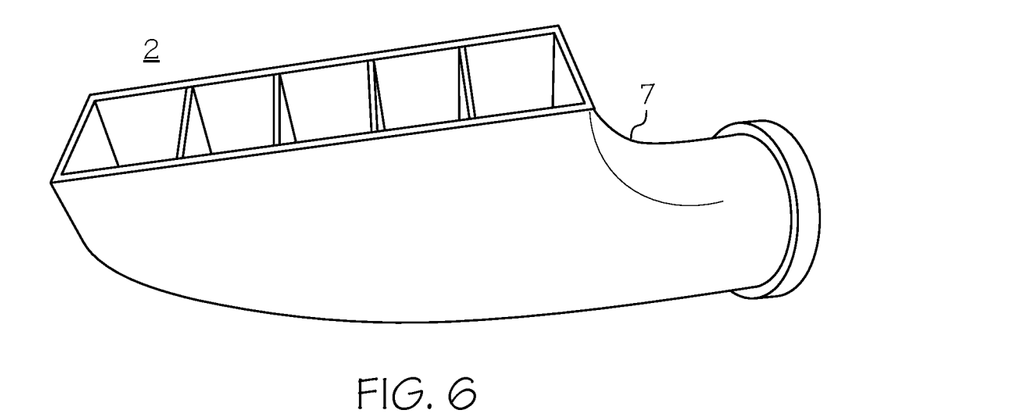
FIG. 6 is another example of the second aspect of a carbon nanotube enhanced polymer of FIG. 2.
Figure 7:
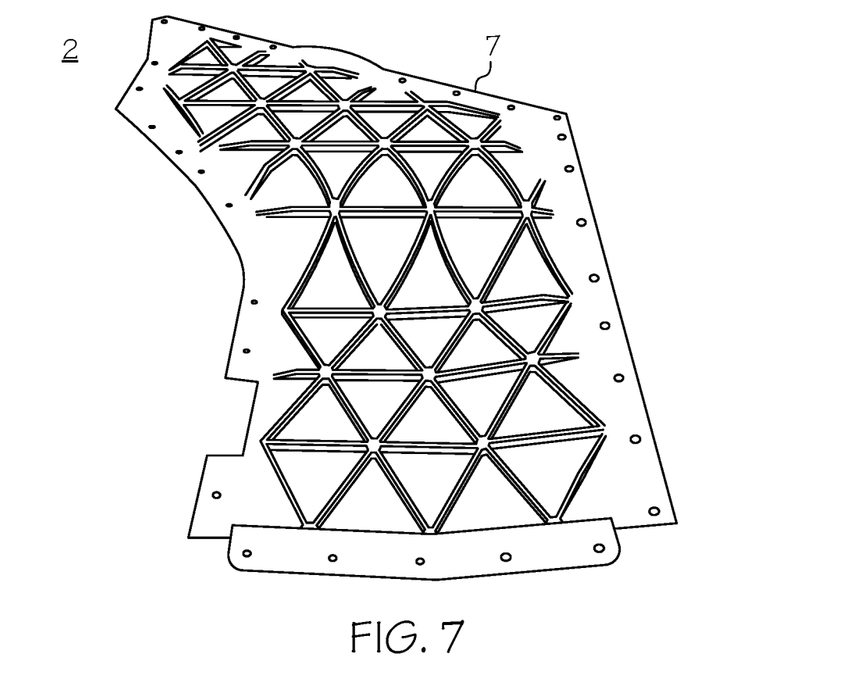
FIG. 7 is another example of the second aspect of a carbon nanotube enhanced polymer of FIG. 2.

FIGS. 6 and 7 illustrate that the carbon nanotube enhanced polymer 2 may take the form of an article 7 having final or near-final dimensions and having carbon nanotube sheetlets (not shown) embedded within a polymer matrix (not shown) of the article. The dimensions and characteristics of the article 7 are not limited and may depend upon application of the article. In one aspect, the article 7 may be a component of an air or space vehicle, such a component of an air revitalization system of an air or space vehicle. FIG. 6 illustrates an exemplary article 7 having final or near-final dimensions, particularly a duct of an air revitalization system of an air or space vehicle. FIG. 7 illustrates an exemplary article 7 having final or near-final dimensions, particularly a panel of an air revitalization system of an air or space vehicle.

As previously mentioned, the carbon nanotube sheetlets may each include a network of intertwined carbon nanotubes. The carbon nanotubes may be intertwined in any manner, including an ordered intertwining of the carbon nanotubes or a disorder intertwining of the carbon nanotubes. An illustration of a portion of a carbon nanotube sheetlet 6 including a network of disordered intertwined carbon nanotubes 8 is shown in FIG. 5.

Previous attempts have been made to disperse individual carbon nanotubes within a polymer matrix to impart conductive properties to the polymer. However, individual carbon nanotubes tend to agglomerate, which tends to complicate subsequent processing. For example, agglomeration of individual carbon nanotubes tends to clog nozzles used in fused deposition modeling. More specifically, fused deposition modeling works by laying down material in layers from a polymer filament to form the shape of the article having final or near-final dimensions. However, as individual carbon nanotubes tend to agglomerate, processing becomes complicated due to clogging of a nozzle used to lay down the layers of a polymer incorporated with individual carbon nanotubes. Also, individual carbon nanotubes may become airborne, raising concerns with handling of the carbon nanotubes. The presently described carbon nanotube enhanced polymer addresses these issues by providing carbon nanotube sheetlets, which each include a network of intertwined carbon nanotubes, mixed with a polymer powder or embedded within a polymer matrix, thus facilitating processing and mitigating handling concerns.

In one aspect, the polymer 4 may include a thermoplastic polymer. The type of thermoplastic polymer is not limited. The thermoplastic polymer may include, for example, polyetherketoneketone (PEKK), polyphenylene sulfide (PPS), polyamide 11, and combinations thereof. In one specific example, the thermoplastic polymer includes polyetherketoneketone (PEKK). In another specific example, the thermoplastic polymer includes polyphenylene sulfide (PPS). In yet another specific example, the thermoplastic polymer includes polyamide 11.

The carbon nanotubes 8 in the plurality of carbon nanotube sheetlets 6 may be selected from single walled carbon nanotubes, double walled carbon nanotubes, or any other multi-walled carbon nanotubes, or mixtures thereof.

The dimensions of the carbon nanotube sheetlets 6 are not limited and may depend upon the application of the carbon nanotube enhanced polymer 2. If the dimensions of the carbon nanotube sheetlets 6 are too small, then concerns with handling of the carbon nanotubes 8 may be raised. Accordingly, in one aspect, the carbon nanotube sheetlets 6 may have a length, which is hereby defined as the largest dimension of the sheetlets, of at least 0.1 μm, preferably at least 1 μm, more preferably at least 10 μm. If the dimensions of the carbon nanotube sheetlets 6 are too large, then the overall mechanical performance of the carbon nanotube enhanced polymer 2 may be reduced. Accordingly, in one aspect, the carbon nanotube sheetlets 6 may have a length, which is hereby defined as the largest dimension of the sheetlets 6, of at most 10,000 μm, preferably at most 1000 μm. In a specific example, the carbon nanotube sheetlets 6 have a length in a range of 50 to 200 μm.

A width of the carbon nanotube sheetlets 6 is not limited and may depend upon the application of the carbon nanotube enhanced polymer 2. In one aspect, a length to width ratio of the plurality of carbon nanotube sheetlets 6 may be in a range of 1:1 to 1000:1, preferably in a range of 1:1 to 100:1, more preferably in a range of 1:1 to 10:1. In a specific example, a length to width ratio of the plurality of carbon nanotube sheetlets 6 is in a range of 1:1 to 2:1.

A thickness of the carbon nanotube sheetlets 6 is not limited and may depend upon the application of the carbon nanotube enhanced polymer 2. In one aspect, a length to thickness ratio of the plurality of carbon nanotube sheetlets 6 may preferably be in a range of 1:1 to 100:1, more preferably in a range of 1:1 to 10:1.

An amount of the carbon nanotube sheetlets 6 is not limited and may depend upon the application of the carbon nanotube enhanced polymer 2 and the desired conductivity to be imparted. For example, for the carbon nanotube enhanced polymer 2 to be considered to have anti-static properties, the carbon nanotube enhanced polymer 2 may be embedded with an amount of the carbon nanotube sheetlets 6 sufficient to provide a resistance of less than 1E12 ($1\times10^{12}$) Ohms, preferably less than 1E11 ($1\times10^{11}$) Ohms, more preferably less than 1E10 ($1\times10^{10}$) Ohms. For example, for the carbon nanotube enhanced polymer 2 to be considered to have static dissipative properties, the carbon nanotube enhanced polymer 2 may be embedded with an amount of the carbon nanotube sheetlets 6 sufficient to provide a resistance of less than 1E9 ($1\times10^{9}$) Ohms, preferably less than 1E8 ($1\times10^{8}$) Ohms, more preferably less than 1E7 ($1\times10^{7}$) Ohms. To provide a static dissipative bleed desired for air and space vehicles, a maximum resistance of 1E9 ($1\times10^{9}$) Ohms can be provided to the carbon nanotube enhanced polymers 2 by embedding a sufficient amount of the carbon nanotube sheetlets 6.

The amount of carbon nanotube sheetlets 6 may be defined by a weight percentage loading of the carbon nanotubes 8. If the weight percentage loading of the carbon nanotubes 8 is too low, then the conductivity to be imparted to the carbon nanotube enhanced polymer 2 is limited. Accordingly, in one aspect, a weight percentage loading of the carbon nanotubes 8 in the polymer matrix is at least 0.0001 wt %, preferably at least 0.001 wt %, more preferably at least 0.01 wt %. If the weight percentage loading of the carbon nanotubes 8 is too high, then mechanical properties of the carbon nanotube enhanced polymer 2 may be reduced. Accordingly, in one aspect, a weight percentage loading of the carbon nanotubes 8 in the polymer matrix 4B is at most 25 wt %, preferably at most 5 wt %, more preferably at most 1 wt %. In an example, a weight percentage loading of the carbon nanotubes 8 in the polymer matrix 4B is in a range of 0.05 wt % to 0.5 wt %. In another example, the carbon nanotube sheetlets 6 are 100 μm×100 μm square sheets, and a weight loading of carbon nanotubes 8 in the polymer matrix 4B is in a range of 0.05 wt % to 0.5 wt % loading.

The carbon nanotube sheetlets 6 may be made by any suitable method. For example, the carbon nanotube sheetlets 6 may be made from a carbon nanotube sheet, the carbon nanotube sheet including a network of intertwined carbon nanotubes 8, in which the carbon nanotube sheet is subjected to cutting or grinding into a plurality of carbon nanotube sheetlets 6.

A second embodiment of the present description relates to methods for manufacturing the carbon nanotube enhanced polymer 2. The carbon nanotube enhanced polymer 2 is not restricted to the following methods for manufacturing.

The following methods for manufacturing the carbon nanotube enhanced polymer included methods for manufacturing of a carbon nanotube enhanced polymer in the form of a precursor for subsequent processing, such as a precursor for subsequent processing by an additive manufacturing process and in the form of an article final or near-final dimensions, such as an article formed by an additive manufacturing process.

Figure 8:
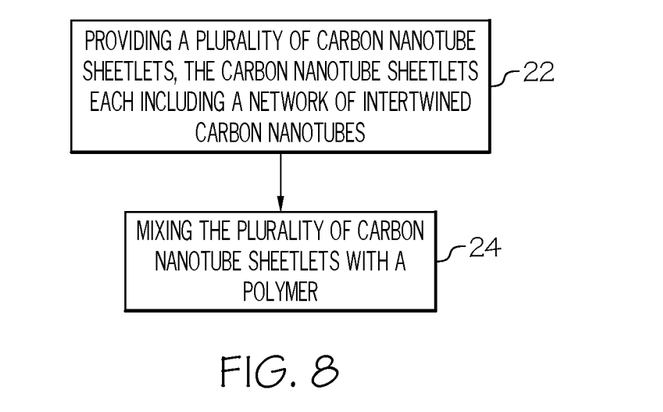
FIG. 8 is a flow diagram for an exemplary method for manufacturing a carbon nanotube enhanced polymer.

FIG. 8 illustrates a first aspect of a method of manufacturing a carbon nanotube enhanced polymer. The first aspect of the method for manufacturing a carbon nanotube enhanced polymer includes, at block 22, providing a plurality of carbon nanotube sheetlets, the carbon nanotube sheetlets each including a network of intertwined carbon nanotubes. The method of manufacturing a carbon nanotube enhanced polymer further includes, at block 24, mixing the plurality of carbon nanotube sheetlets with a polymer.

The step of block 22, providing a plurality of carbon nanotube sheetlets, may include providing a carbon nanotube sheet, the carbon nanotube sheet including a network of intertwined carbon nanotubes, and cutting or grinding the carbon nanotube sheet into the plurality of carbon nanotube sheetlets. The carbon nanotube sheet may be manufactured in any known manner, such as by chemical vapor deposition of carbon nanotubes into the shape of a sheet. The step of providing a plurality of carbon nanotube sheetlets is not limited to providing the plurality of carbon nanotube sheetlets in this manner.

In an example, the step of block 24, mixing the plurality of carbon nanotube sheetlets with a polymer, may include mixing the plurality of carbon nanotube sheetlets with a polymer powder. However, the mixing the plurality of carbon nanotube sheetlets with a polymer is not limited thereto.

In the case mixing the plurality of carbon nanotube sheetlets with a polymer, the present methods mitigating handling concerns associated with previous attempts to incorporate individual carbon nanotubes into polymers. Specifically, previous attempts have raised handling concerns due to the small size of the individual carbon nanotubes and potential for individual carbon nanotubes to become airborne. The presently described methods for manufacturing carbon nanotube enhanced polymer addresses these issues by providing carbon nanotube sheetlets, which each include a network of intertwined carbon nanotubes, thus mitigating handling concerns associated with individual carbon nanotubes.

In another example, the step of block 24, mixing the plurality of carbon nanotube sheetlets with a polymer, may include embedding the plurality of carbon nanotube sheetlets within a polymer matrix formed from the polymer.

In the case of including the embedding the plurality of carbon nanotube sheetlets within a polymer matrix, the step of embedding the plurality of carbon nanotube sheetlets within the polymer matrix may include mixing the plurality of carbon nanotube sheetlets with a polymer powder, and sintering the polymer powder to embed the plurality of carbon nanotube sheetlets within a polymer matrix formed from the polymer powder.

For the purpose of the present application, the sintering may include heating to above or below a melting temperature of the polymer powder, as long as the polymer powder is heated sufficiently to consolidate together the particles of polymer powder and the carbon nanotube sheetlets. In an example, the mixture of carbon nanotube sheetlets and polymer powder may be laser sintered. In another example, the mixture of carbon nanotube sheetlets and polymer powder may be provided in a layer-by-layer manner to a powder bed and selectively laser sintered to build a desired shape of an article.

Figure 9:
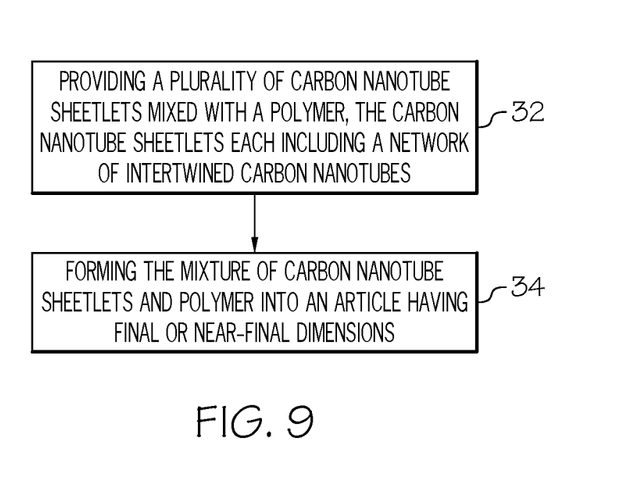
FIG. 9 is a flow diagram for an exemplary method for manufacturing a carbon nanotube enhanced polymer.

FIG. 9 illustrates a second aspect of a method of manufacturing a carbon nanotube enhanced polymer. The second aspect of the method for manufacturing a carbon nanotube enhanced polymer includes, at block 32, providing a plurality of carbon nanotube sheetlets mixed with a polymer, the carbon nanotube sheetlets each including a network of intertwined carbon nanotubes. The method of manufacturing a carbon nanotube enhanced polymer further includes, at block 34, forming the mixture of carbon nanotube sheetlets and polymer into an article having final or near-final dimensions.

In the step of block 32, providing a plurality of carbon nanotube sheetlets mixed with a polymer, the polymer may be provided as a polymer powder mixed with the plurality of carbon nanotube sheetlets. However, the step of providing the plurality of carbon nanotube sheetlets mixed with the polymer is not limited to the polymer being provided as a polymer powder.

In the case of the polymer being provided as a polymer powder, the article may be formed by a process that includes an additive manufacturing process, such as selective laser sintering, that builds an article from powder. However, even when the polymer is provided as a polymer powder, the article may be formed by a non-additive manufacturing process or an additive manufacturing process other than selective laser sintering.

In the step of block 32, providing a plurality of carbon nanotube sheetlets mixed with a polymer, the polymer may be provided as a polymer matrix having the plurality of carbon nanotube sheetlets embedded therein. However, the step of providing the plurality of carbon nanotube sheetlets mixed with the polymer is not limited to the polymer being provided as a polymer matrix having the plurality of carbon nanotube sheetlets embedded therein.

In the case of the polymer being provided as a polymer matrix having the plurality of carbon nanotube sheetlets embedded therein, the article may be formed by a process that includes an additive manufacturing process, such as selective laser sintering or fused deposition modeling. However, even when the polymer is provided as a polymer matrix having the plurality of carbon nanotube sheetlets embedded therein, the article may be formed by a non-additive manufacturing process or an additive manufacturing process other than selective laser sintering or fused deposition modeling.

In the case of the article being formed by selective laser sintering, the plurality of carbon nanotube sheetlets mixed with a polymer matrix may be provided in the form of a plurality of particulates, such as pellets, having the plurality of carbon nanotube sheetlets embedded therein, and the article may be built from the plurality of particulates in a layer-by-layer manner.

In a case of the article being formed by fused deposition modeling, the plurality of carbon nanotube sheetlets mixed with a polymer matrix may be provided in the form of a filament, such as a strand or fiber, and the article may be built from the filament in a layer-by-layer manner. In the case of fused deposition modeling, previous attempts to incorporate individual carbon nanotubes resulting is processing problems. In particular, as individual carbon nanotubes tend to agglomerate, processing becomes complicated due to clogging of a nozzle used to lay down the layers of a polymer incorporated with individual carbon nanotubes. The presently described carbon nanotube enhanced polymer addresses these issues by providing carbon nanotube sheetlets, which each include a network of intertwined carbon nanotubes, mixed with a polymer powder or embedded within a polymer matrix, thus facilitating processing by avoiding agglomeration of individual carbon nanotubes. The presently described carbon nanotube enhanced polymer addresses these issues by providing carbon nanotube sheetlets, which each include a network of intertwined carbon nanotubes, mixed with a polymer powder or embedded within a polymer matrix, thus facilitating processing and mitigating handling concerns.

In another example, the step of block 34, forming the mixture of carbon nanotube sheetlets and polymer into an article having final or near-final dimensions, may include one or more of various plastic molding technologies, such as injection molding, compression molding, and extrusion molding.

Figure 10:
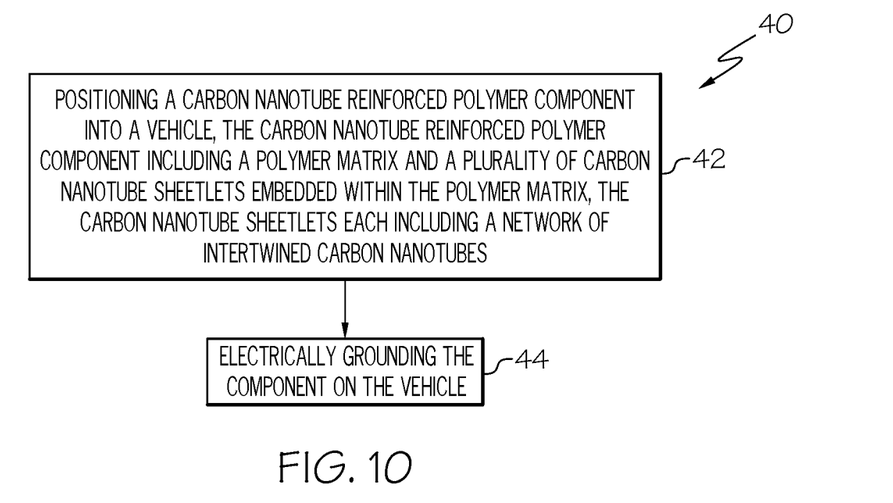
FIG. 10 is a flow diagram for an exemplary method for using a carbon nanotube enhanced polymer.

As shown in FIG. 10, the present description further relates to a method 40 for using a carbon nanotube enhanced polymer formed into a component of an air or space vehicle. The method includes, at block 42, positioning a component of the carbon nanotube enhanced polymer component into a vehicle, the carbon nanotube enhanced polymer component including a polymer matrix and a plurality of carbon nanotube sheetlets embedded within the polymer matrix, the carbon nanotube sheetlets each including a network of intertwined carbon nanotubes, as previously described. The method further includes, at block 34, electrically grounding the component on the vehicle. The component may have, for example, a maximum resistance of 1E9 (1×10^9) Ohms to provide a static dissipative bleed desired for air and space vehicles.

In an experimental test, polyetherketoneketone (PEKK) powder was mixed with carbon nanotube sheetlets and melted into a disk using conventional methods. The test indicated a surface resistance of 10E4 Ohms for the carbon nanotube enhanced PEKK polymer with 0.5% carbon nanotube (CNT) weight loading, which is a factor of 10,000 times more conductive that conventional carbon fiber enhanced PEKK polymers with a 15% carbon fiber weight loading having a surface resistivity on average of 10E8 Ohms. The carbon nanotube weight loading of 0.5% is 1/30 less than the conventional 15% carbon fiber weight loading in a polymer matrix. This reduced loading is expected to permit for improved overall mechanical properties, particularly toughness.

The disclosed carbon nanotube enhanced polymers and methods are described in the context of an aircraft and spacecraft. However, one of ordinary skill in the art will readily recognize that the disclosed carbon nanotube enhanced polymers and methods may be utilized for a variety of applications. For example, the disclosed carbon nanotube enhanced polymers and methods may be implemented in various types of vehicles including, for example, passenger ships, automobiles, marine products (boats, motors, etc.) and the like. Various non-vehicle applications are also contemplated.

Although various aspects of the disclosed carbon nanotube enhanced polymers, articles of manufacture, and methods have been shown and described, modifications may occur to those skilled in the art upon reading the specification. The present application includes such modifications and is limited only by the scope of the claims.

What is claimed is:

1. A carbon nanotube enhanced polymer comprising:
   a polymer powder; and
   a plurality of carbon nanotube sheets in admixture with the polymer powder to yield a mixture, wherein each carbon nanotube sheet of the plurality of carbon nanotube sheets has a length in a range of 0.1 to 10,000 µm, and wherein each carbon nanotube sheet of the plurality of carbon nanotube sheets consists of a network of intertwined carbon nanotubes that are intertwined with each other to form a shape of the carbon nanotube sheet such that the network of intertwined carbon nanotubes holds the shape of the carbon nanotube sheet by way of the intertwining of the carbon nanotubes.

2. The carbon nanotube enhanced polymer of claim 1 wherein the polymer powder is selected from the group consisting of: polyetherketoneketone (PEKK), polyphenylene sulfide (PPS), polyamide 11, and combinations thereof.

3. The carbon nanotube enhanced polymer of claim 1 wherein each carbon nanotube sheet of the plurality of carbon nanotube sheets has the length in a range of 10 to 1000 µm.

4. The carbon nanotube enhanced polymer of claim 1 wherein each carbon nanotube sheet of the plurality of carbon nanotube sheets has the length in a range of 50 to 200 µm.

5. The carbon nanotube enhanced polymer of claim 1 wherein a weight percentage loading of the carbon nanotubes in the mixture is in a range of 0.0001 wt % to 25 wt %.

6. A method for manufacturing a carbon nanotube enhanced polymer, comprising:
   providing the carbon nanotube enhanced polymer of claim 1; and
   embedding the plurality of carbon nanotube sheets within a polymer matrix formed from the polymer powder to form an article.

7. The method of claim 6 wherein embedding the plurality of carbon nanotube sheets within the polymer matrix formed from the polymer powder comprising sintering the mixture.

8. A carbon nanotube enhanced polymer article formed by the method of claim 6.

9. A carbon nanotube enhanced polymer comprising:
a polymer matrix; and
a plurality of carbon nanotube sheets embedded within the polymer matrix, wherein each carbon nanotube sheet of the plurality of carbon nanotube sheets has a length in a range of 0.1 to 10,000 µm, and wherein each carbon nanotube sheet of the plurality of carbon nanotube sheets consists of a network of intertwined carbon nanotubes that are intertwined with each other to form a shape of the carbon nanotube sheet such that the network of intertwined carbon nanotubes is configured to hold the shape of the carbon nanotube sheet by way of the intertwining of the carbon nanotubes.

10. The carbon nanotube enhanced polymer of claim 9 wherein the polymer matrix is selected from the group consisting of: polyetherketoneketone (PEKK), polyphenylene sulfide (PPS), polyamide 11, and combinations thereof.

11. The carbon nanotube enhanced polymer of claim 9 wherein each carbon nanotube sheet of the plurality of carbon nanotube sheets has the length in a range of 10 to 1000 µm.

12. The carbon nanotube enhanced polymer of claim 9 wherein each carbon nanotube sheet of the plurality of carbon nanotube sheets has the length in a range of 50 to 200 µm.

13. The carbon nanotube enhanced polymer of claim 9 wherein the carbon nanotube enhanced polymer is embedded with an amount of the carbon nanotube sheets sufficient to provide a resistance of the carbon nanotube enhanced polymer of less than 1E12 ($1\times10^{12}$) Ohms.

14. The carbon nanotube enhanced polymer of claim 9 wherein the carbon nanotubes comprise 0.0001 wt % to 25 wt % of a total weight of the polymer matrix and the plurality of carbon nanotube sheets.

15. The carbon nanotube enhanced polymer of claim 9 being a component of an air or space vehicle.

16. The carbon nanotube enhanced polymer of claim 9 wherein the carbon nanotube enhanced polymer is in a form of a filament.

17. A plurality of particulates of carbon nanotube enhanced polymer, wherein each particulate comprises the carbon nanotube enhanced polymer of claim 9.

18. A method for manufacturing a carbon nanotube enhanced polymer, comprising:
providing the plurality of particulates of carbon nanotube enhanced polymer of claim 17; and
sintering the plurality of particulates of carbon nanotube enhanced polymer to form an article.

19. The method of claim 18 wherein sintering the plurality of particulates of carbon nanotube enhanced polymer comprises at least one of selective laser sintering and fused deposition modeling.

20. A carbon nanotube enhanced polymer article formed by the claim 18.

* * * * *